(12) United States Patent
Sidebottom

(10) Patent No.: US 11,695,631 B1
(45) Date of Patent: Jul. 4, 2023

(54) GENERATING CANDIDATE LINKS AND CANDIDATE PATHS BEFORE SELECTING LINKS FOR AN OPTIMIZED OPTICAL NETWORK PLAN

(71) Applicant: Juniper Networks, Inc., Sunnyvale, CA (US)

(72) Inventor: Greg Sidebottom, Ottawa (CA)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 17/583,443

(22) Filed: Jan. 25, 2022

Related U.S. Application Data

(63) Continuation of application No. 16/355,041, filed on Mar. 15, 2019, now Pat. No. 11,252,034.

(51) Int. Cl.
*H04L 41/0826* (2022.01)
*H04L 41/14* (2022.01)
(Continued)

(52) U.S. Cl.
CPC ........ *H04L 41/0826* (2013.01); *H04L 41/145* (2013.01); *H04L 45/02* (2013.01);
(Continued)

(58) Field of Classification Search
CPC .......................... H04L 41/0826; H04L 41/145
See application file for complete search history.

(56) References Cited

U.S. PATENT DOCUMENTS 9,036,504 B1 * 5/2015 Miller ..................... H04L 45/02
370/254
9,602,387 B2 3/2017 Wood
(Continued)

FOREIGN PATENT DOCUMENTS

CN 102148708 A 8/2011
CN 104982070 A 10/2015
(Continued)

OTHER PUBLICATIONS

Co-pending U.S. Appl. No. 16/355,041, inventor Sidebottom; Greg, filed Mar. 15, 2019.
(Continued)

*Primary Examiner* — John A Follansbee
*Assistant Examiner* — Raqiul A Choudhury
(74) *Attorney, Agent, or Firm* — Harrity & Harrity, LLP

(57) ABSTRACT

A device receives network data associated with a network that includes network devices interconnected by links, and receives parameters associated with determining a network plan for the network. The device generates candidate links for each potential network plan of multiple potential network plans for the network, based on the parameters and based on a criterion associated with generating the candidate links. The device generates candidate paths for each potential network plan based on the parameters, and selects a portion of the candidate links and a portion of the candidate paths. The device generates each potential network plan based on the portion of the candidate links and the portion of the candidate paths, and identifies a potential network plan, of the multiple potential network plans, that reduces resource usage associated with operating the network. The device causes the potential network plan to be implemented in the network.

20 Claims, 15 Drawing Sheets

(51) Int. Cl.
    *H04L 45/02*  (2022.01)
    *H04L 45/42*  (2022.01)
    *H04L 45/12*  (2022.01)
    *H04L 45/24*  (2022.01)
(52) U.S. Cl.
    CPC ............ *H04L 45/123* (2013.01); *H04L 45/24* (2013.01); *H04L 45/42* (2013.01)

(56) References Cited

U.S. PATENT DOCUMENTS

| | | | |
|---|---|---|---|
| 9,742,638 | B1 | 8/2017 | McCabe et al. |
| 10,187,840 | B2 | 1/2019 | Pragada et al. |
| 10,374,747 | B2 | 8/2019 | Wood et al. |
| 2005/0188108 | A1 | 8/2005 | Carter et al. |
| 2005/0228531 | A1 | 10/2005 | Genovker et al. |
| 2009/0290588 | A1 | 11/2009 | Kawahigashi |
| 2012/0263185 | A1 | 10/2012 | Bejerano et al. |
| 2014/0140216 | A1 | 5/2014 | Liu et al. |
| 2014/0156848 | A1 | 6/2014 | Uttaro et al. |
| 2016/0344618 | A1 | 11/2016 | Oprea et al. |
| 2016/0373336 | A1* | 12/2016 | Chen ................ H04L 69/22 |
| 2017/0155581 | A1 | 6/2017 | Wang et al. |
| 2017/0317780 | A1* | 11/2017 | Wood ................ H04L 41/12 |
| 2018/0026850 | A1 | 1/2018 | Obregon et al. |
| 2018/0212864 | A1* | 7/2018 | Myung ............... H04L 47/12 |
| 2019/0166009 | A1 | 5/2019 | Parvin et al. |
| 2019/0268267 | A1* | 8/2019 | Pignataro ........... H04L 45/741 |

FOREIGN PATENT DOCUMENTS

| | | |
|---|---|---|
| CN | 105743691 A | 7/2016 |
| CN | 105743794 A | 7/2016 |
| WO | 2016083841 A1 | 6/2016 |

OTHER PUBLICATIONS

Extended European Search Report for Application No. EP19216856.5, dated Jun. 19, 2020, 9 pages.
Guo L., et al., "The Node Degree for Wireless Ad Hoc Networks in Shadow Fading Environments," IEEE, pp. 815-820, 2011.
Extended European Search Report for Application No. EP22205482.7, dated Feb. 3, 2023, 14 pages.

\* cited by examiner

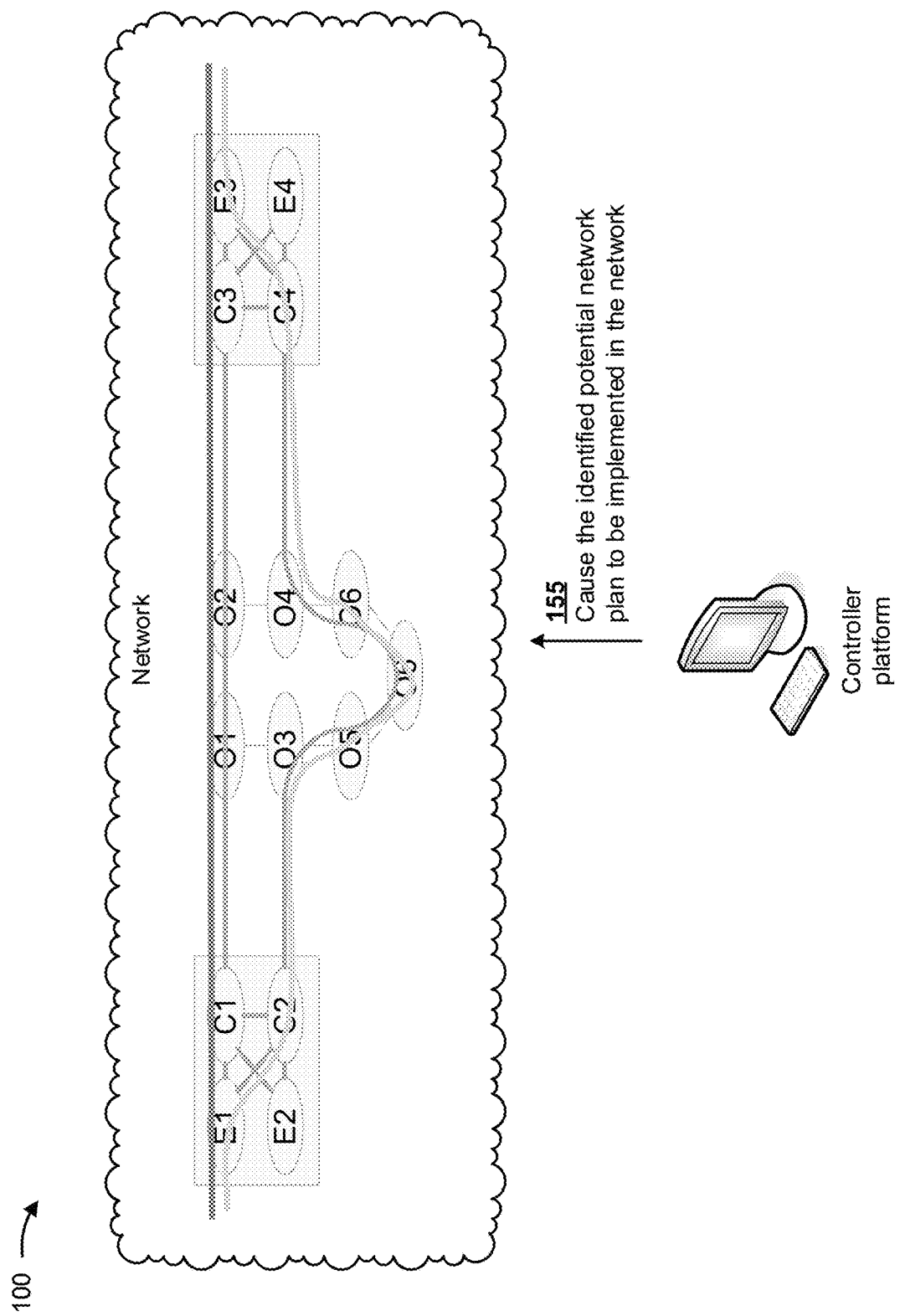

GENERATING CANDIDATE LINKS AND CANDIDATE PATHS BEFORE SELECTING LINKS FOR AN OPTIMIZED OPTICAL NETWORK PLAN

RELATED APPLICATION

This application is a continuation of U.S. patent application Ser. No. 16/355,041, filed Mar. 15, 2019, which is incorporated herein by reference in its entirety.

BACKGROUND

Network planning and design is an iterative process, encompassing topological design, network-synthesis, and network-realization. Network planning and design is aimed at ensuring that a new or an existing network or service satisfies needs of network subscribers and/or network operators.

SUMMARY

According to some implementations, a method may include receiving network data associated with a network, wherein the network includes a plurality of network devices interconnected by links, and receiving parameters associated with determining a network plan for the network, wherein the parameters are associated with determining candidate links and candidate paths. The method may include generating the candidate links for each potential network plan of a plurality of potential network plans for the network, wherein the candidate links are generated based on the parameters and based on a criterion associated with generating the candidate links. The method may include generating the candidate paths for each potential network plan of the plurality of potential network plans for the network, wherein the candidate paths are generated based on the parameters, and selecting a portion of the candidate links and a portion of the candidate paths for generating each potential network plan. The method may include generating each potential network plan of the plurality of network plans based on the portion of the candidate links and the portion of the candidate paths generated for each potential network plan. The method may include identifying a potential network plan, of the plurality of potential network plans, that reduces resource usage associated with operating the network, and causing the identified potential network plan to be implemented in the network by the plurality of network devices and the links.

According to some implementations, a device may include one or more memories, and one or more processors, communicatively coupled to the one or more memories, to receive network data associated with a network, wherein the network includes a plurality of network devices interconnected by links, and receive parameters associated with determining a network plan for the network, wherein the parameters are associated with determining candidate links and candidate paths. The one or more processors may generate the candidate links for the network plan for the network, wherein the candidate links are generated based on the parameters and based on a criterion associated with generating the candidate links. The one or more processors may generate the candidate paths for the network plan for the network, wherein the candidate paths are generated based on the parameters, and may select a portion of the candidate links and a portion of the candidate paths for generating the network plan. The one or more processors may generate the network plan based on the portion of the candidate links and the portion of the candidate paths generated for the network plan, and may cause the network plan to be implemented in the network by the plurality of network devices and the links.

According to some implementations, a non-transitory computer-readable medium may store instructions that include one or more instructions that, when executed by one or more processors, cause the one or more processors to receive proposed network data associated with a network to be implemented, wherein the network is to include a plurality of network devices interconnected by links, and receive parameters associated with determining a network plan for the network, wherein the parameters are associated with determining candidate links and candidate paths. The one or more instructions may cause the one or more processors to generate the candidate links for the network plan for the network, wherein the candidate links are generated based on the parameters and based on one of a first criterion, a second criterion, or a third criterion associated with generating the candidate links. The one or more instructions may cause the one or more processors to generate the candidate paths for the network plan for the network, wherein the candidate paths are generated based on the parameters, and select a portion of the candidate links and a portion of the candidate paths for generating the network plan. The one or more instructions may cause the one or more processors to generate the network plan based on the portion of the candidate links and the portion of the candidate paths generated for the network plan, and utilize the network plan to implement the network via the plurality of network devices and the links.

BRIEF DESCRIPTION OF THE DRAWINGS

FIGS. 1A-1J are diagrams of one or more example implementations described herein.

DETAILED DESCRIPTION

Figure 1A:
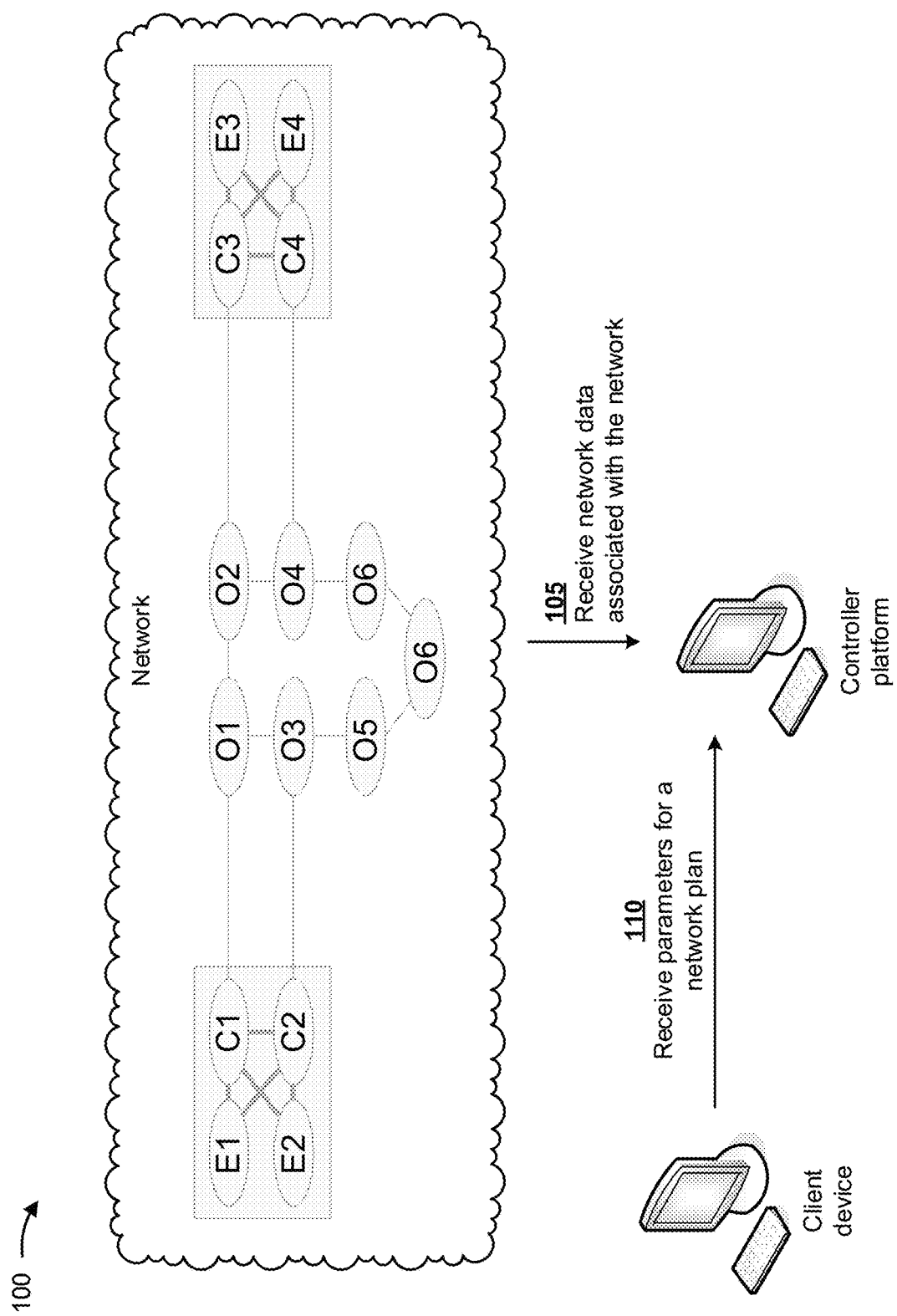

The following detailed description of example implementations refers to the accompanying drawings. The same reference numbers in different drawings may identify the same or similar elements.

A network planning and design system may design a network that includes network devices (e.g., routers, switches, gateways, firewalls, etc.) and links provided between the network devices. However, the network planning and design system may utilize a rigid approach to selecting links for the network plan and may compute routes for the network plan only after selecting the links. If the rigid approach to selecting links is utilized, with the computation of routes after selecting the links, the network planning and design system may not generate an optimized network plan, which results in inefficient network operation, inefficient utilization of network resources, and waste of computing resources (e.g., processing resources, memory resources, and/or the like), networking resources, and/or the like.

Some implementations described herein provide a controller or planner platform that generates candidate links and candidate paths before selecting links for an optimized optical network plan. For example, the controller platform may receive network data associated with a network that includes network devices interconnected by links, and may receive parameters associated with determining a network plan for the network, where the parameters may be associated with determining candidate links and candidate paths. The controller platform may generate the candidate links for each potential network plan of multiple potential network plans for the network, where the candidate links may be generated based on the parameters and based on at least one criterion associated with generating the candidate links. The controller platform may generate the candidate paths for each potential network plan, where the candidate paths may be generated based on the parameters, and may select a portion of the candidate links and a portion of the candidate paths for generating each potential network plan. The controller platform may generate each potential network plan based on the portion of the candidate links and the portion of the candidate paths generated for each potential network plan. The controller platform may identify a potential network plan, of the multiple potential network plans, that reduces resource usage associated with operating the network as compared to the remaining multiple potential network plans, and may cause the identified potential network plan to be implemented in the network by the network devices and the links.

In this way, the candidate links and the candidate paths, generated before selecting the links, may enable the controller platform to determine and implement an optimized network plan. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like.

FIGS. 1A-1J are diagrams of one or more example implementations 100 described herein. As shown in FIG. 1A, a network may be associated with a controller platform. In some implementations, the network may include a packet optical network with multiple network devices and multiple links provided between the multiple network devices. In some implementations, the network may include multiple network layers, such as a flow layer, an Internet Protocol (IP) or packet layer, an optical layer, and/or the like. The network devices may include edge network devices (e.g., E1, E2, E3, and E4), core network devices (e.g., C1, C2, C3, and C4), and/or the like. As shown in FIG. 1A, two edge network devices (e.g., E1 and E2) and two core network devices (e.g., C1 and C2) may be provided at a first site, two edge network devices (e.g., E3 and E4) and two core network devices (e.g., C3 and C4) may be provided at a second site, and/or the like. Links (e.g., optical nodes O1, O2, O3, O4, O5, O6, and O6) may be provided between the first site and the second site.

As further shown in FIG. 1A, and by reference number 105, the controller platform may receive network data associated with the network. In some implementations, the network data may include topology data associated with the network, path data associated with the network, and/or the like. The topology data may include data identifying the network devices (e.g., data identifying types of the network devices, network identifiers of the network devices, locations of the network devices, hardware and/or software associated with the network devices, other network devices that are adjacent to the network devices, links connected to the network devices, ports associated with the network devices, and/or the like), the links interconnecting the network devices (e.g., data identifying types of the links, protocols used by the links, network devices to which the links are connected, ports associated with the network devices, and/or the like), utilizations of the network devices (e.g., capacities of the network devices, throughputs of the network devices, and/or the like), capacities of the links, and/or the like. The path data may include data identifying paths through the network provided by the network devices, sources (e.g., one or more of the network devices, and/or the like) of the paths through the network, destinations (e.g., one or more of the network devices, and/or the like) of the paths through the network, utilizations of the paths through the network (e.g., capacities of the paths, throughputs of the paths, and/or the like), and/or the like.

The controller platform may periodically receive the network data from the network (e.g., at particular time intervals in seconds, minutes, hours, days, and/or the like), may continuously receive the network data from the network, and/or the like. For example, the controller platform may provide, to the network devices, a request for the network data, and the network devices may provide the network data to the controller platform based on the request.

As further shown in FIG. 1A, and by reference number 110, the controller platform may receive (e.g., from a client device) parameters associated with a network plan. In some implementations, the parameters may be associated with determining candidate IP links and candidate IP paths for potential network plans. The parameters may include a parameter indicating that the candidate IP paths are to be generated prior to selecting the candidate IP links for each potential network plan, a parameter indicating a maximum node degree associated with the candidate IP links, a parameter indicating minimum possible paths per flow associated with the candidate IP links, a parameter indicating diverse possible paths associated with the candidate IP links, a parameter indicating a quantity of shortest paths per demand associated with the candidate IP paths, a parameter indicating that diversity is required for the candidate IP paths, a parameter indicating that multiple paths with similar lengths are permitted for the candidate IP paths, a parameter indicating that the candidate IP paths are to avoid edge network devices in transit, and/or the like.

While implementations described herein related to IP links and IP paths, the implementations may be applied to other types of links and/or paths, such as optical links, optical paths, and/or the like.

Although FIG. 1A shows specific quantities of sites, nodes, network devices, links, and/or the like, in some implementations, the network may include more (or less) sites, nodes, network devices, links, and/or the like than depicted in FIG. 1A. For example, the network may include hundreds, thousands, and/or the like of network devices and/or links that generate thousands, millions, billions, etc. of data points. In this way, the controller platform may handle thousands, millions, billions, etc. of data points within a time period (e.g., when determining network plans), and thus may provide "big data" capability.

Figure 1B:
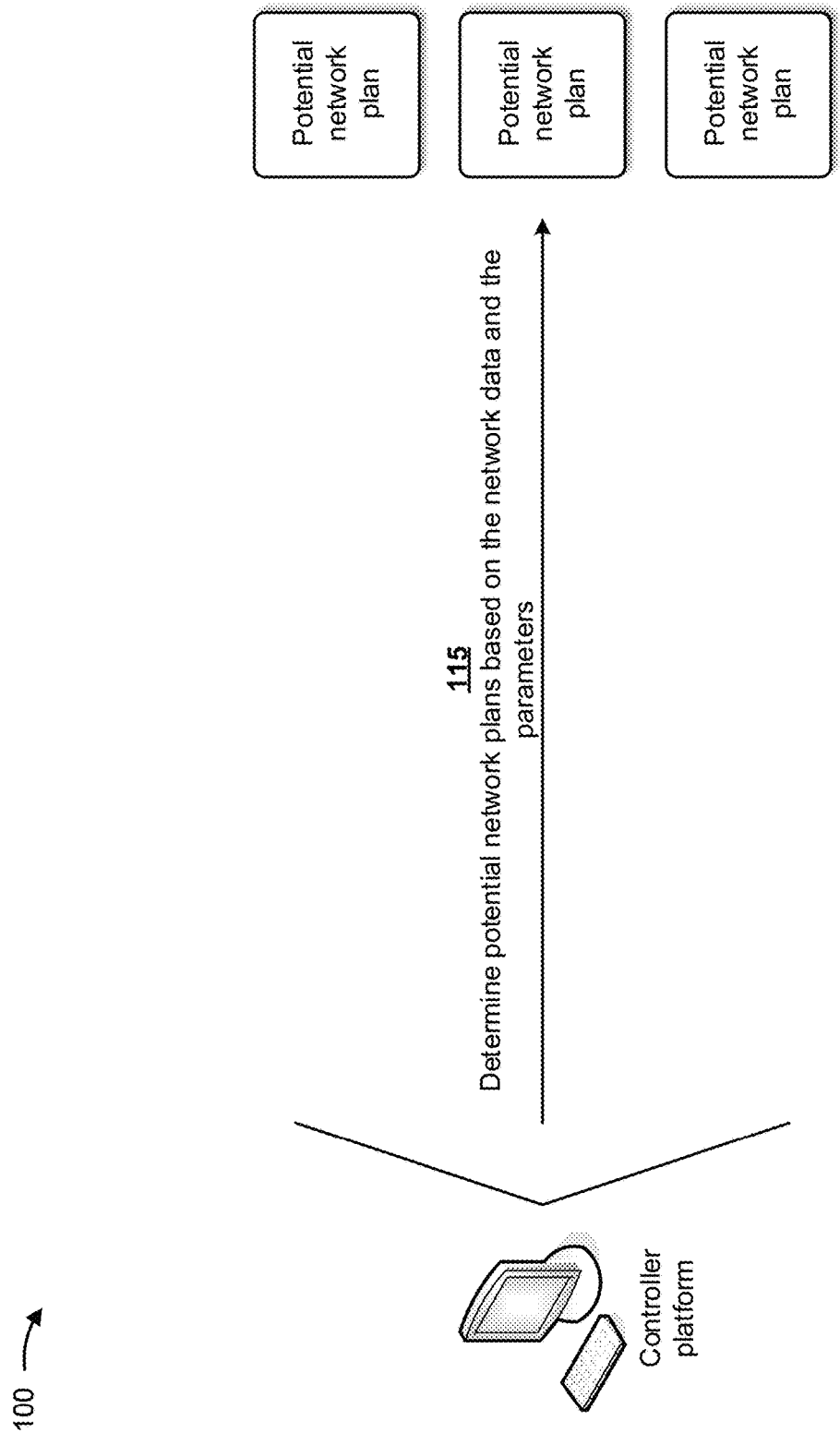

As shown in FIG. 1B, and by reference number 115, the controller platform may determine potential network plans based on the network data and the parameters. For example, the controller platform may utilize the network data to identify candidate links and candidate paths for the potential network plans, as described below. The controller platform may utilize the parameters to reduce the quantities of the candidate links and the candidate paths for the potential network plans, as also described below. Thus, the controller platform may utilize the parameters to identify subsets of the candidate links and the candidate paths, identified based on the network data, and may determine the potential network plans based on the subsets of the candidate links and the candidate paths. In this way, the controller platform may conserve computing resources (e.g., processing resources, memory resources, and/or the like) utilized to determine the potential network plans.

Figure 1C:
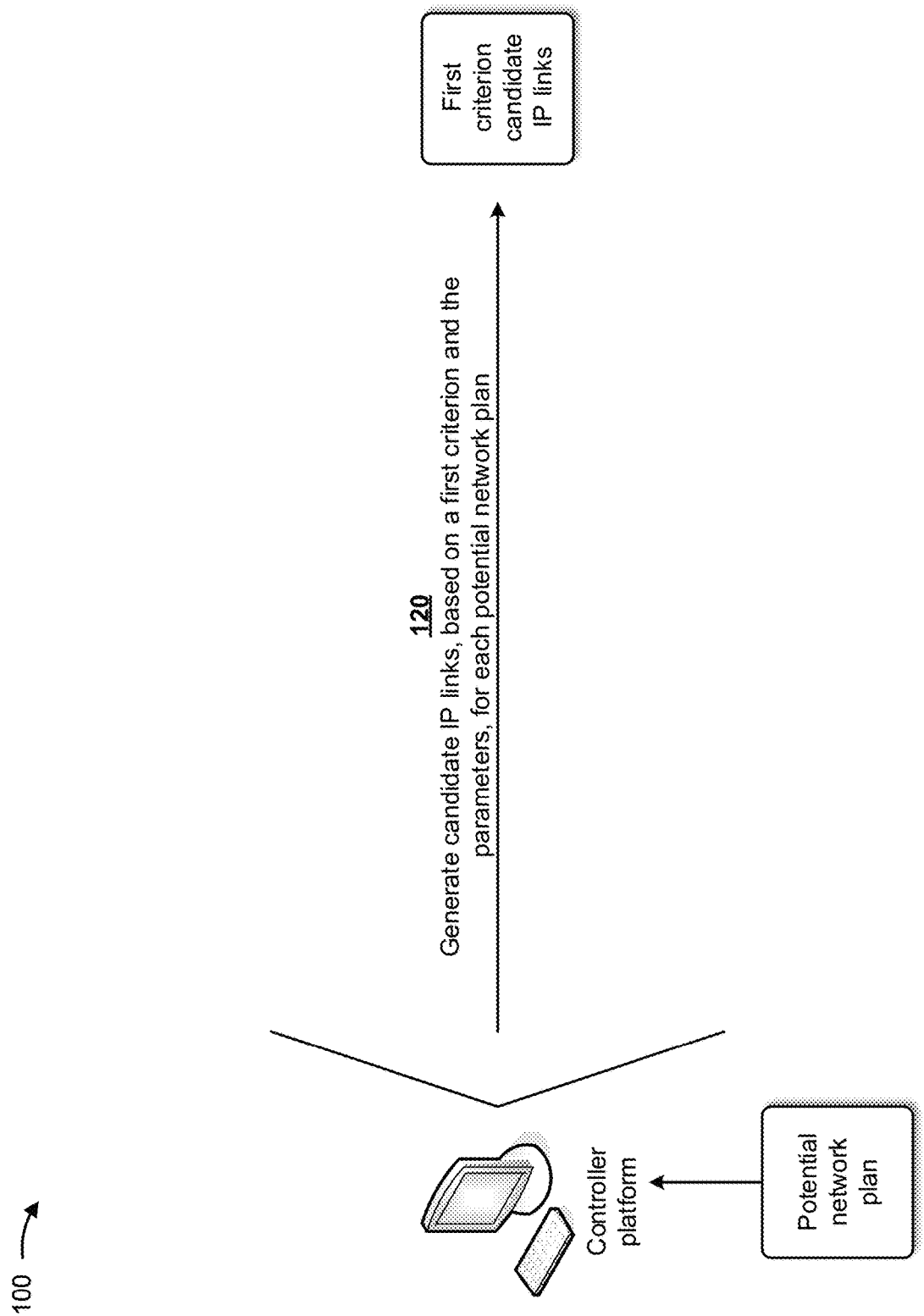

As shown in FIG. 1C, and by reference number 120, the controller platform, when determining the potential network plans, may generate candidate IP links, based on a first criterion and the parameters, for each potential network plan. The parameters may include the parameters described above. The first criterion may be specified by the controller platform or may be received from a client device (e.g., based on input provided to the client device). The first criterion may indicate that the controller platform may consider possible candidate IP links associated with every pair of IP nodes in the IP layer.

Figure 1D:
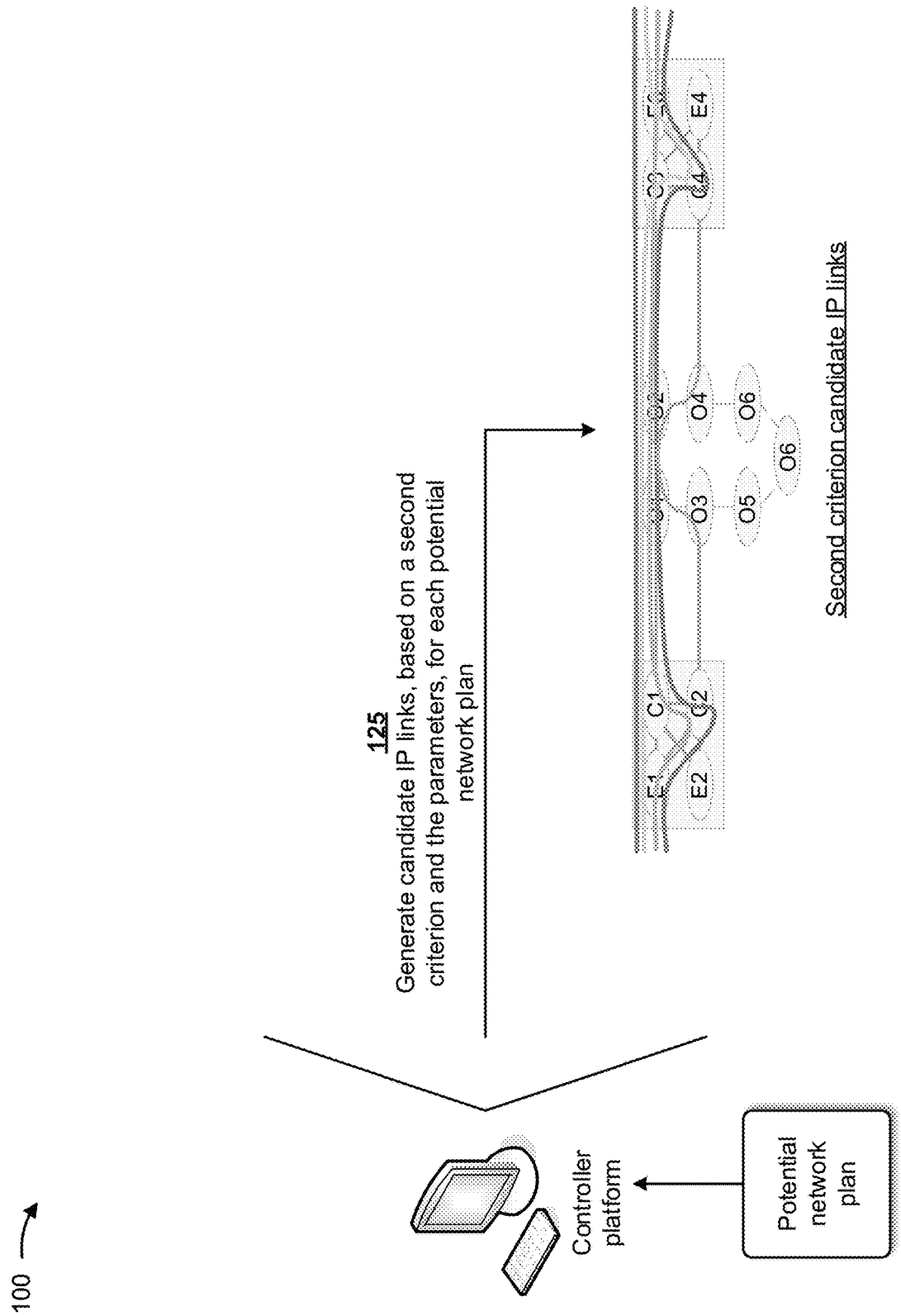

As shown in FIG. 1D, and by reference number 125, the controller platform, when determining the potential network plans, may alternatively generate candidate IP links, based on a second criterion and the parameters, for each potential network plan. The parameters may include the parameters described above. The second criterion may be specified by the controller platform or may be received from a client device (e.g., based on input provided to the client device). The second criterion may indicate that the controller platform may classify IP nodes in the IP layer as edge nodes (e.g., E1, E2, etc.) if the IP nodes include traffic flow demands or may classify the IP nodes as core nodes (e.g., C1, C2, etc.) if the IP nodes include connections to the optical layer. The second criterion may further indicate that the controller platform may consider possible candidate IP links between edge nodes and core nodes located at a same site, may consider possible candidate IP links between core nodes located at a same site, may consider possible candidate IP links between core nodes located at different sites on a shortest optical path, and/or the like.

Figure 1E:
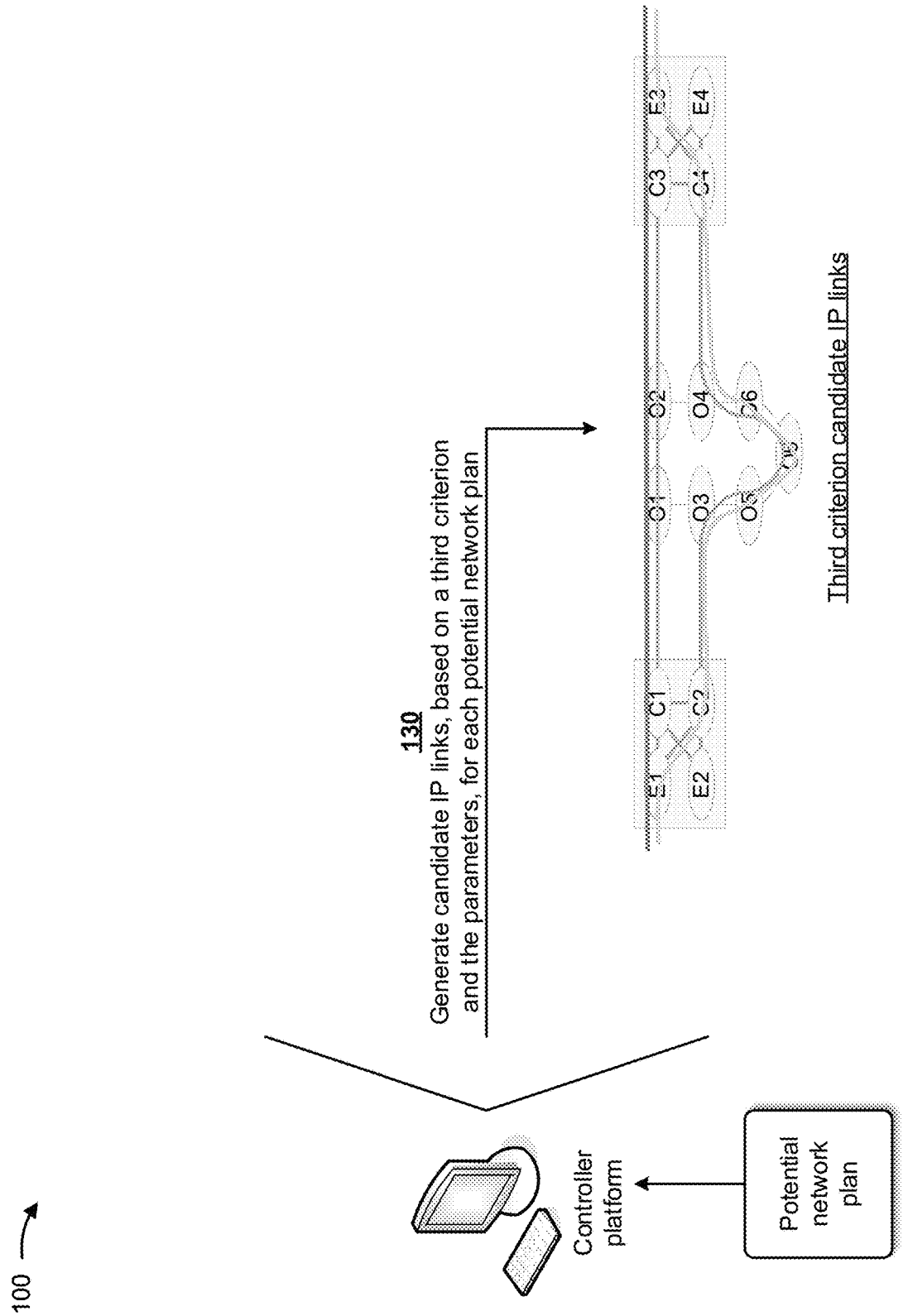

As shown in FIG. 1E, and by reference number 130, the controller platform, when determining the potential network plans, may alternatively generate candidate IP links, based on a third criterion and the parameters, for each potential network plan. The parameters may include the parameters described above. The third criterion may be specified by the controller platform or may be received from a client device (e.g., based on input provided to the client device). The third criterion may indicate that the controller platform may classify IP nodes in the IP layer as edge nodes (e.g., E1, E2, etc.) if the IP nodes include traffic flow demands or may classify the IP nodes as core nodes (e.g., C1, C2, etc.) if the IP nodes include connections to the optical layer. The third criterion may further indicate that the controller platform may consider possible candidate IP links between edge nodes and core nodes located at a same site, may consider possible candidate IP links between core nodes located at a same site, may consider possible candidate IP links between core nodes located at different sites when there are disjoint optical paths between the different sites, may consider possible candidate IP links that connect core nodes with disjoint optical paths, and/or the like.

Figure 1F:
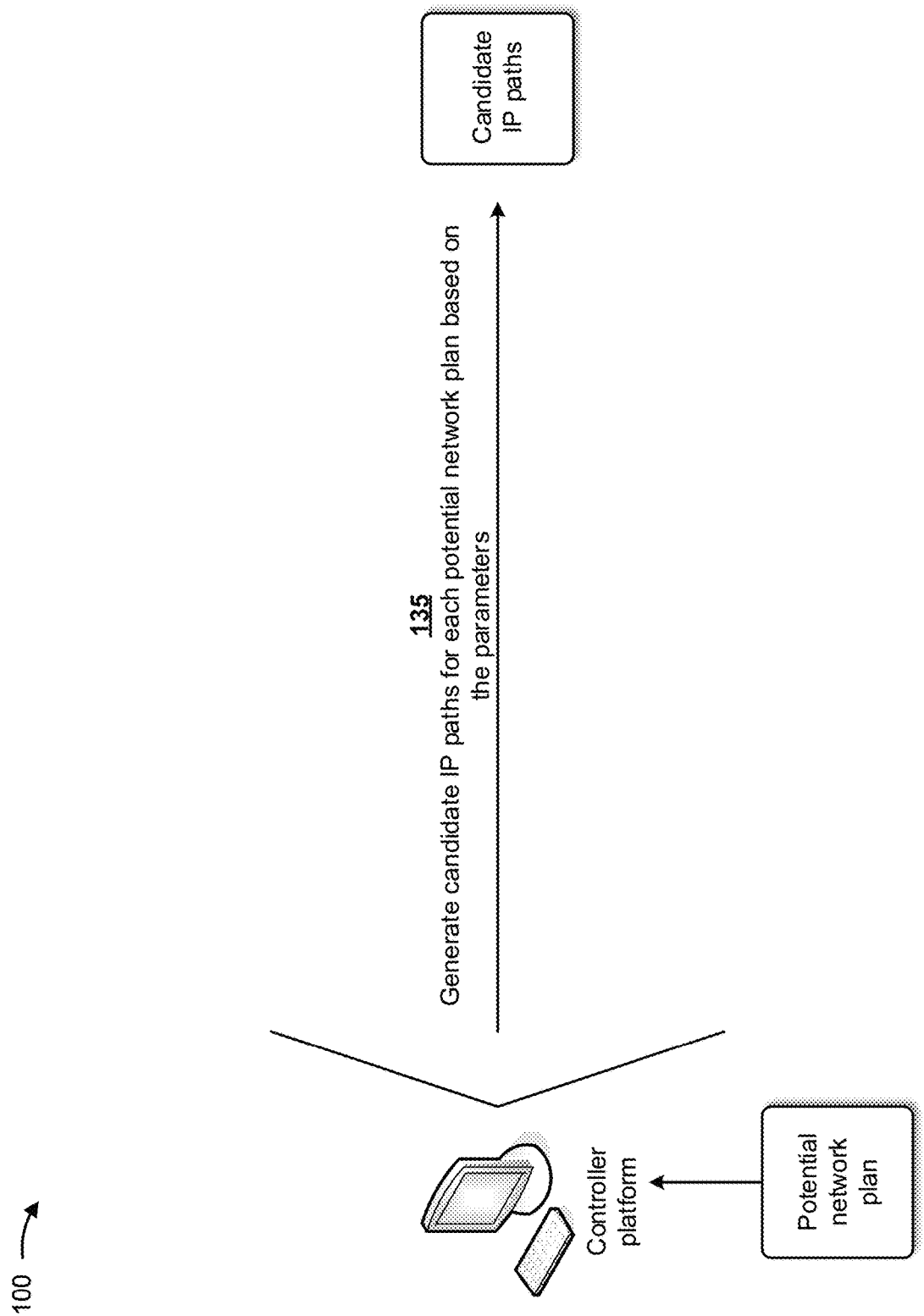

As shown in FIG. 1F, and by reference number 135, the controller platform, when determining the potential network plans, may generate candidate IP paths for each potential network plan based on the parameters. In some implementations, the controller platform may generate the candidate IP paths based on the parameter indicating a quantity of shortest paths per demand associated with the candidate IP paths, the parameter indicating that diversity is required for the candidate IP paths, the parameter indicating that multiple paths with similar length are permitted for the candidate IP paths, and/or the parameter indicating that the candidate IP paths are to avoid edge network devices in transit.

Figure 1G:
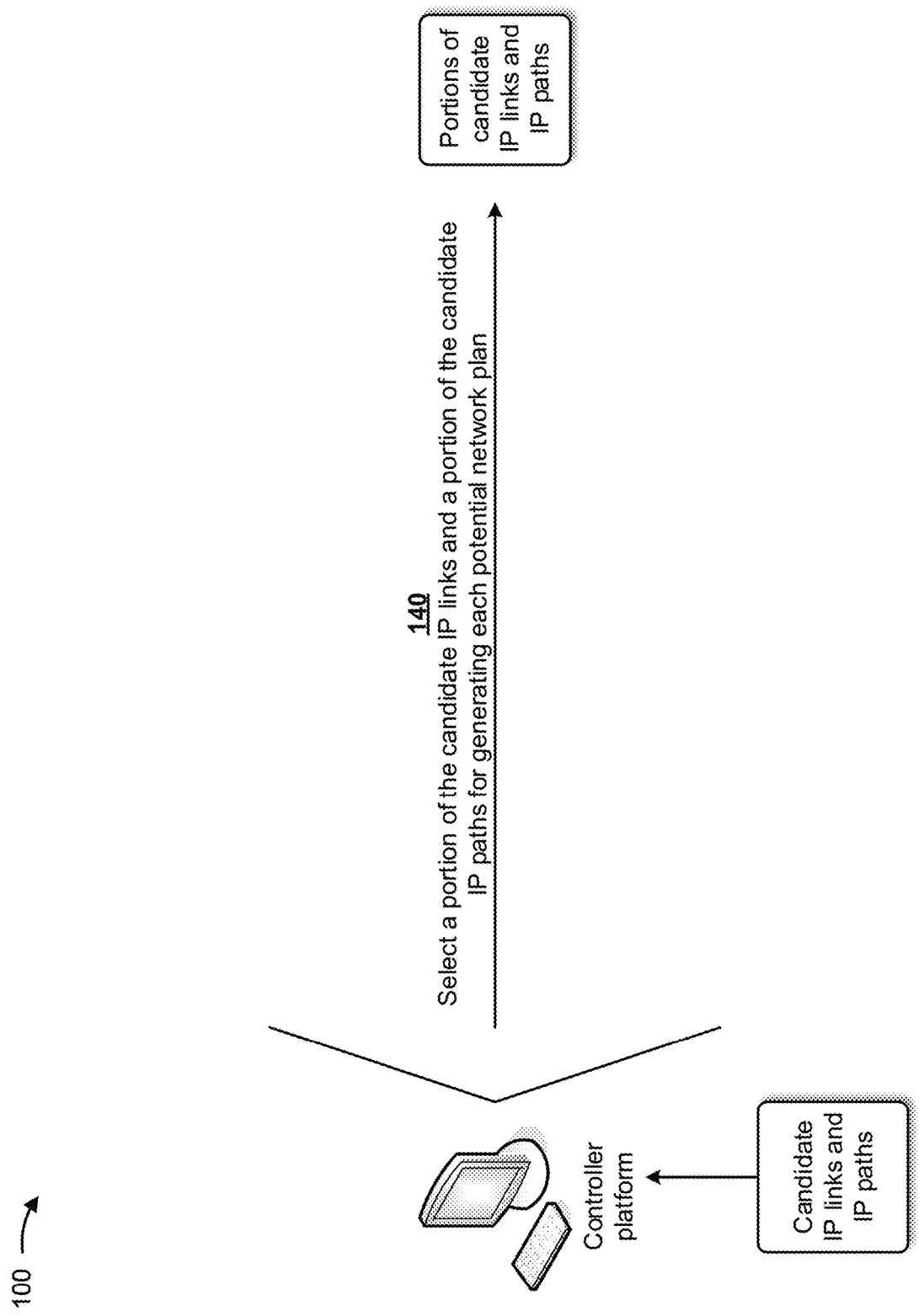

As shown in FIG. 1G, and by reference number 140, the controller platform may select a portion of the candidate IP links and a portion of the candidate IP paths for generating each potential network plan. For example, the controller platform may select a portion of the candidate IP links and a portion of the candidate IP paths for a potential network plan, and may determine a cost (e.g., resource usage by the network) associated with the potential network plan. The controller platform may select a subset of the portion of the candidate IP links and a subset of the portion of the candidate IP paths in an attempt to reduce the cost associated with the potential network plan. The controller platform may continue to perform this procedure until the cost associated with the potential network plan is reduced, can no longer be minimized, and/or the like.

Figure 1H:
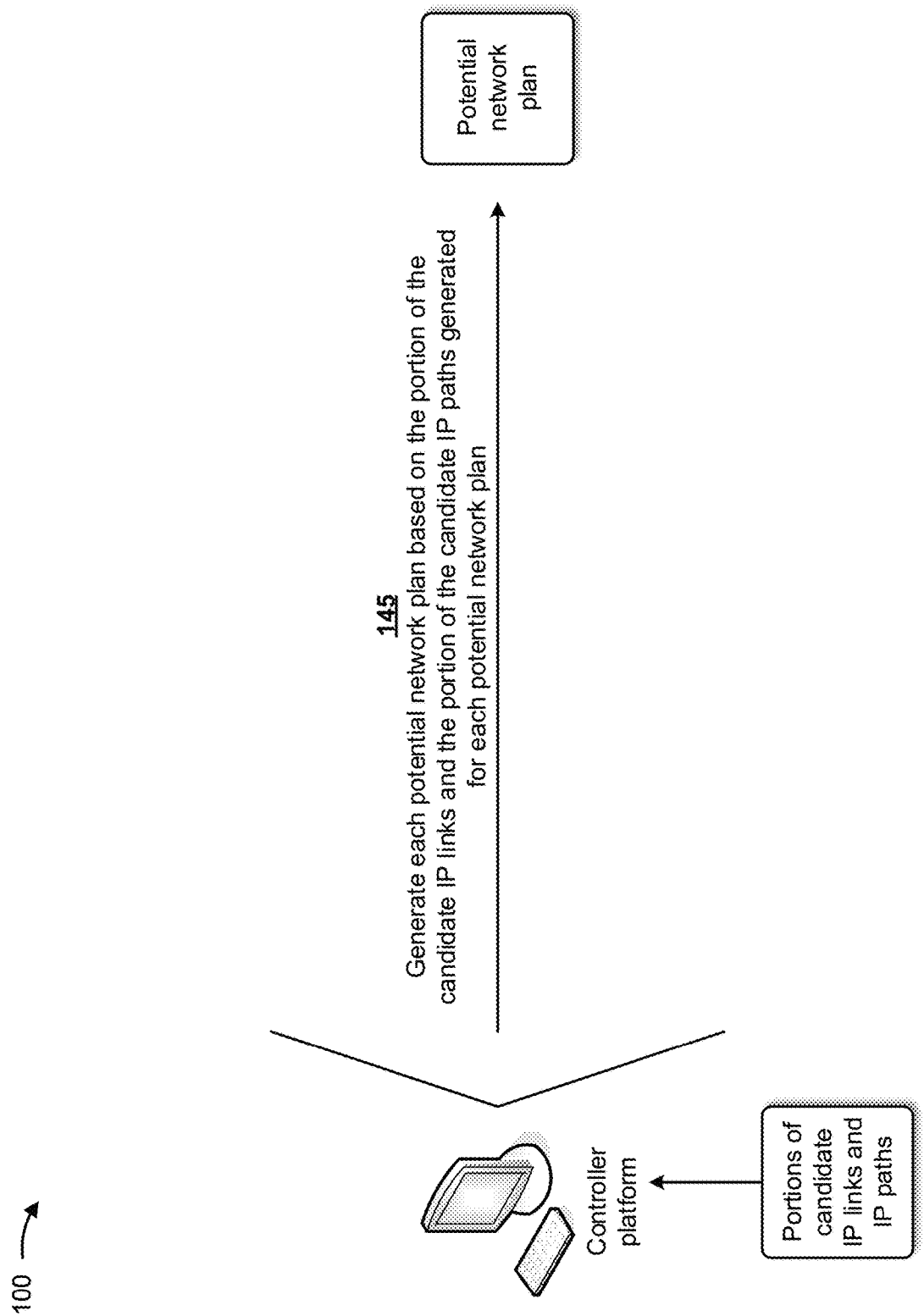

As shown in FIG. 1H, and by reference number 145, the controller platform may generate each potential network plan based on the portion of the candidate IP links and the portion of the candidate IP paths generated for each potential network plan. For example, the controller platform may combine information identifying the portion of the candidate IP links and information identifying the portion of candidate IP paths to generate each potential network plan. Thus, each potential network plan may include information identifying the combination of the portion of the candidate IP links and the portion of candidate IP paths.

Figure 1I:
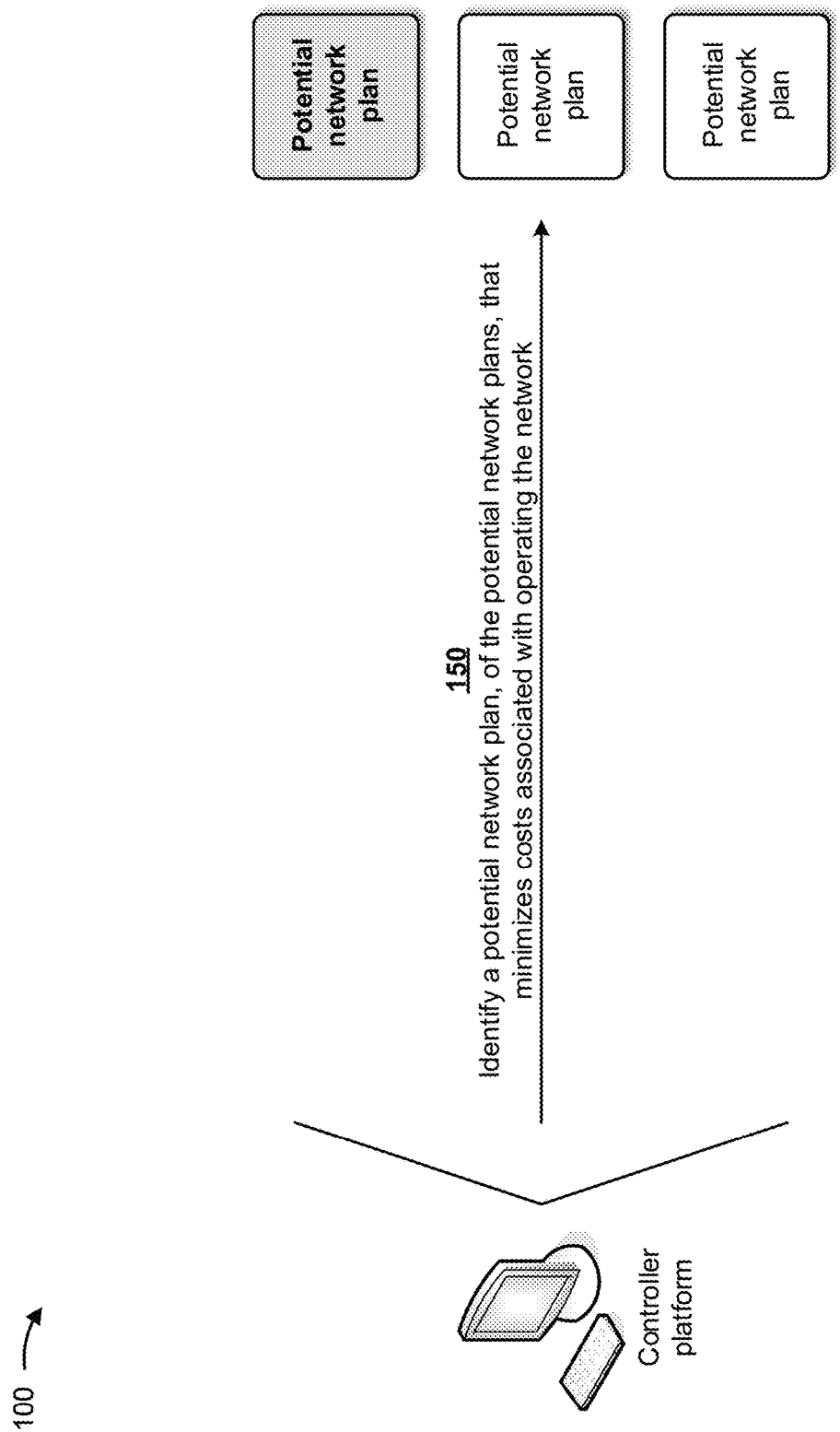

As shown in FIG. 1I, and by reference number 150, the controller platform may identify a potential network plan, of the potential network plans, that minimizes costs associated with operating the network (e.g., reduces resource usage by the network, as compared to other potential network plans). In some implementations, the controller platform may compare the costs determined for each of the potential network plans, and may select a potential network plan with a lowest cost. In some implementations, the controller platform may select a potential network plan with a lowest quantity of predicted traffic demand failures, even if the potential network plan is not associated with the lowest cost. The controller platform may select a potential network plan with a lowest quantity of predicted traffic demand failures and a lowest cost. In some implementations, the controller platform may provide information identifying the potential network plans to a client device, and may receive a selection of a potential network plan from the client device. The controller platform may utilize the potential network plan identified by the selection.

As shown in FIG. 1J, and by reference number 155, the controller platform may cause the identified potential network plan to be implemented in the network. For example, the controller platform may cause the portion of the candidate links and the portion of the candidate paths selected for the identified network plan to be implemented by the network devices and the links of the network. In some implementations, the controller platform may cause the identified potential network plan to be implemented in the network by providing, to one or more of the network devices, instructions indicating that the one or more network devices, and the links associated with the one or more network devices, are to implement the identified potential network plan. The one or more network devices may receive the instructions and may implement the identified potential network plan based on the instructions. For example, the controller device may provide, to three network devices, instructions indicating that the three network devices (e.g., and two links provided between the three network devices) are to reserve bandwidth for a traffic demand. The three network devices may receive the instructions and may reserve the bandwidth for the traffic demand based on the instructions. As shown in FIG. 1J, the identified potential network plan may create a first path (e.g., E1-C1-O1-O2-C3-E3) and a second path (e.g., E1-C2-O3-O5-O6-C4-E3) through the network.

In some implementations, the controller platform may receive additional network data from the network based on causing the identified potential network plan to be implemented in the network, and may modify the identified potential network plan based on the additional network data to generate a modified potential network plan. For example, if the additional network data indicates that a portion of the network is failing to manage a new traffic demand, the controller platform may modify the identified potential network plan to manage the new traffic demand. The controller platform may then cause the modified potential network plan to be implemented in the network, as described above.

In this way, the controller platform may generate candidate links and candidate paths that provide an optimized optical network plan. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like. Furthermore, implementations described herein use a rigorous, computerized process to perform tasks that were not previously performed. For example, currently there does not exist a technique that generates candidate links and candidate paths before selecting links for an optimized optical network plan.

As indicated above, FIGS. 1A-1J are provided merely as examples. Other examples may differ from what is described with regard to FIGS. 1A-1J.

Figure 2:
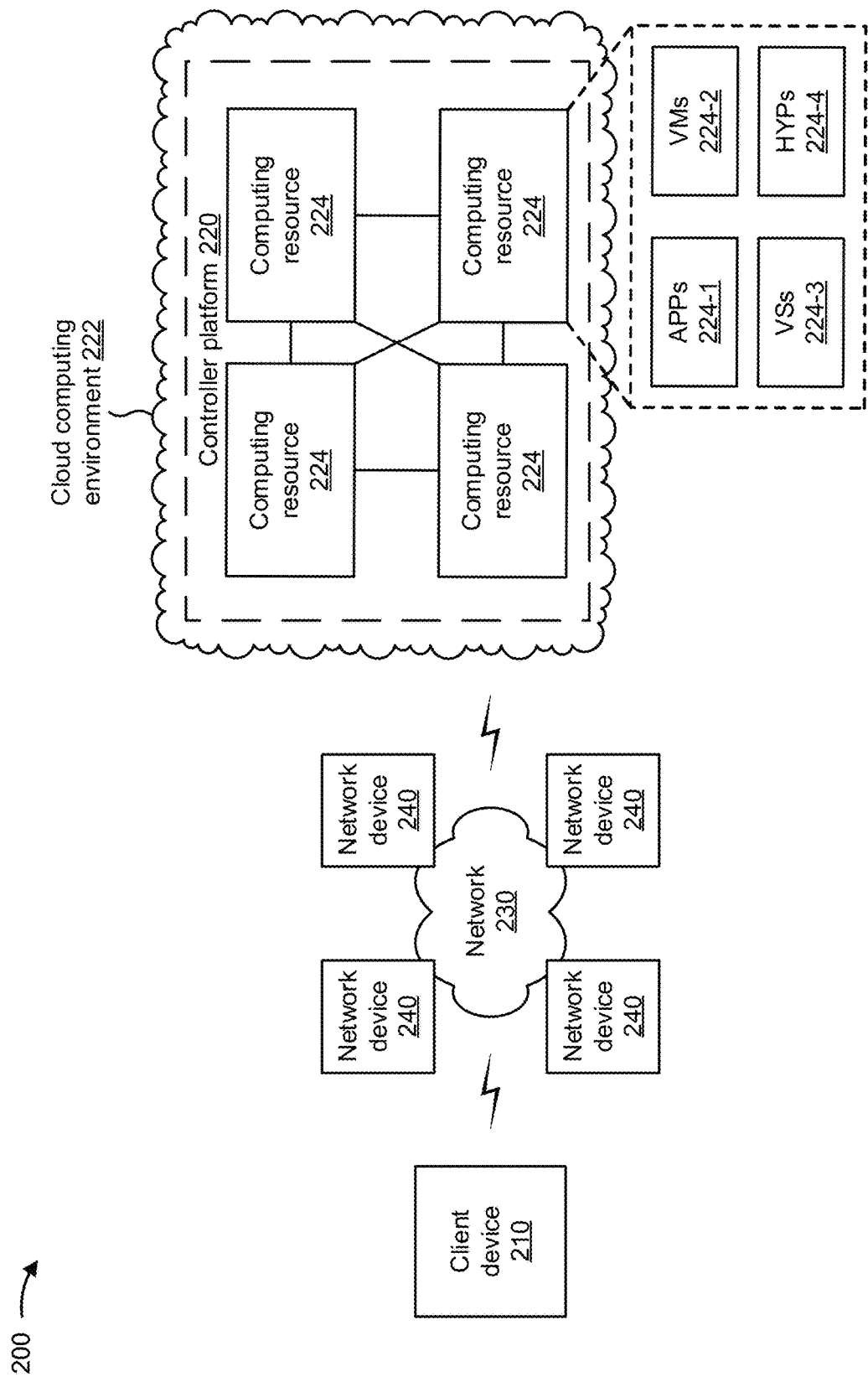
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that generate candidate links and candidate paths before selecting links for an optimized optical network plan. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS").

A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
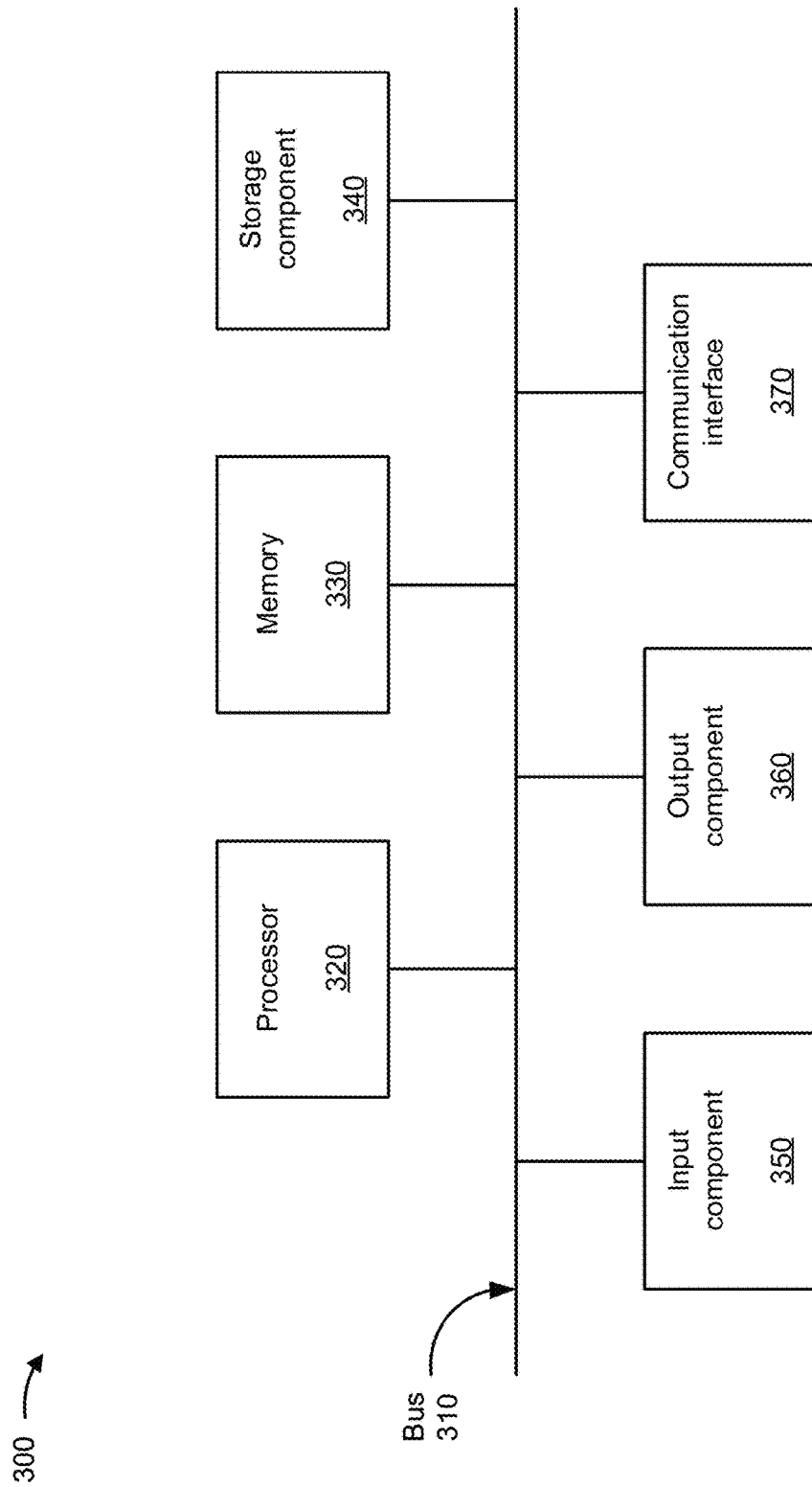
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
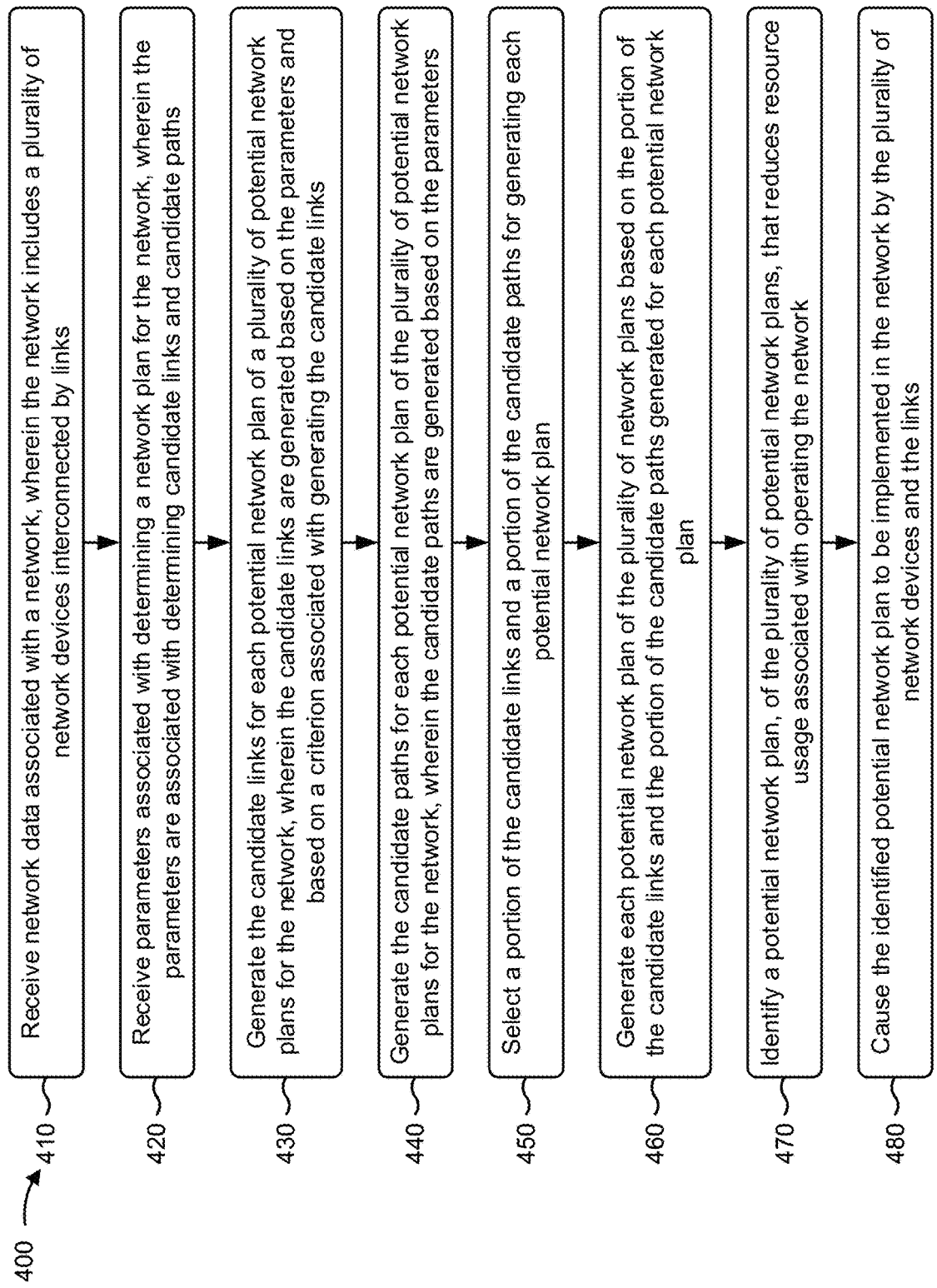
FIGS. 4-6 are flow charts of example processes for generating candidate links and candidate paths before selecting links for an optimized optical network plan.

FIG. 4 is a flow chart of an example process 400 for generating candidate links and candidate paths before selecting links for an optimized optical network plan. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include receiving network data associated with a network, wherein the network includes a plurality of network devices interconnected by links (block 410). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links.

As further shown in FIG. 4, process 400 may include receiving parameters associated with determining a network plan for the network, wherein the parameters are associated with determining candidate links and candidate paths (block 420). For example, the controller platform (e.g., using computing resource 224, processor 320, communication interface 370, and/or the like) may receive parameters associated with determining a network plan for the network, as described above in connection with FIGS. 1A-3. In some aspects, the parameters may be associated with determining candidate links and candidate paths.

As further shown in FIG. 4, process 400 may include generating the candidate links for each potential network plan of a plurality of potential network plans for the network, wherein the candidate links are generated based on the parameters and based on a criterion associated with generating the candidate links (block 430). For example, the controller platform (e.g., using computing resource 224, processor 320, memory 330, and/or the like) may generate the candidate links for each potential network plan of a plurality of potential network plans for the network, as described above in connection with FIGS. 1A-3. In some aspects, the candidate links may be generated based on the parameters and based on a criterion associated with generating the candidate links.

As further shown in FIG. 4, process 400 may include generating the candidate paths for each potential network plan of the plurality of potential network plans for the network, wherein the candidate paths are generated based on the parameters (block 440). For example, the controller platform (e.g., using computing resource 224, processor 320, storage component 340, and/or the like) may generate the candidate paths for each potential network plan of the plurality of potential network plans for the network, as described above in connection with FIGS. 1A-3. In some aspects, the candidate paths may be generated based on the parameters.

As further shown in FIG. 4, process 400 may include selecting a portion of the candidate links and a portion of the candidate paths for generating each potential network plan (block 450). For example, the controller platform (e.g., using computing resource 224, processor 320, memory 330, and/or the like) may select a portion of the candidate links and a portion of the candidate paths for generating each potential network plan, as described above in connection with FIGS. 1A-3.

As further shown in FIG. 4, process 400 may include generating each potential network plan of the plurality of network plans based on the portion of the candidate links and the portion of the candidate paths generated for each potential network plan (block 460). For example, the controller platform (e.g., using computing resource 224, processor 320, storage component 340, and/or the like) may generate each potential network plan of the plurality of network plans based on the portion of the candidate links and the portion of the candidate paths generated for each potential network plan, as described above in connection with FIGS. 1A-3.

As further shown in FIG. 4, process 400 may include identifying a potential network plan, of the plurality of potential network plans, that reduces resource usage associated with operating the network as compared to other of the plurality of potential network plans (block 470). For example, the controller platform (e.g., using computing resource 224, processor 320, memory 330, and/or the like) may identify a potential network plan, of the plurality of potential network plans, that reduces resource usage associated with operating the network, as described above in connection with FIGS. 1A-3.

As further shown in FIG. 4, process 400 may include causing the identified potential network plan to be implemented in the network by the plurality of network devices and the links (block 480). For example, the controller platform (e.g., using computing resource 224, processor 320, memory 330, storage component 340, communication interface 370, and/or the like) may cause the identified potential network plan to be implemented in the network by the plurality of network devices and the links, as described above in connection with FIGS. 1A-3.

Process 400 may include additional implementations, such as any single implementation or any combination of implementations described below and/or in connection with one or more other processes described elsewhere herein.

In some implementations, the network data may include data identifying the plurality of network devices, the links interconnecting the plurality of network devices, capacities of the plurality of network devices, capacities of the links interconnecting the plurality of network devices, paths through the network provided by the plurality of network devices, sources of the paths through the network, destinations of the paths through the network, capacities of the paths through the network, and/or the like.

In some implementations, the parameters may include a parameter indicating that the candidate paths are to be generated prior to selecting the candidate links for each potential network plan, a parameter indicating a maximum node degree associated with the candidate links, a parameter indicating minimum possible paths per flow associated with the candidate links, a parameter indicating diverse possible paths associated with the candidate links, a parameter indicating a quantity of shortest paths per demand associated with the candidate paths, a parameter indicating that diversity is required for the candidate paths, a parameter indicating that multiple paths with similar length are permitted for the candidate paths, a parameter indicating that the candidate paths are to avoid edge network devices in transit, and/or the like.

In some implementations, the criterion may indicate that generating the candidate links is based at least in part on every pair of network devices. In some implementations, the criterion may indicate that the plurality of network devices are to be classified as edge network devices or core network devices when generating the candidate links, that generating the candidate links is based at least in part on edge-to-core links and core-to-core links in a same site of the network, that generating the candidate links is based at least in part on links between cores in different sites of the network, on a shortest path, and/or the like. In some implementations, the criterion may indicate that the plurality of network devices are to be classified as an edge network device or a core network device when generating the candidate links, that generating the candidate links is based at least in part on edge-to-core links and core-to-core links in a same site of the network, that generating the candidate links is based at least in part on disjoint paths between sites of the network, that the candidate links are to connect core network devices with the disjoint paths, and/or the like.

In some implementations, when identifying the potential network plan, of the plurality of potential network plans, that reduces resource usage associated with operating the network comprises, the controller platform may determine a plurality of costs associated with the plurality of potential network plans based on the network data, and may identify the potential network plan that reduces resource usage associated with operating the network based on the plurality of costs associated with the plurality of potential network plans.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
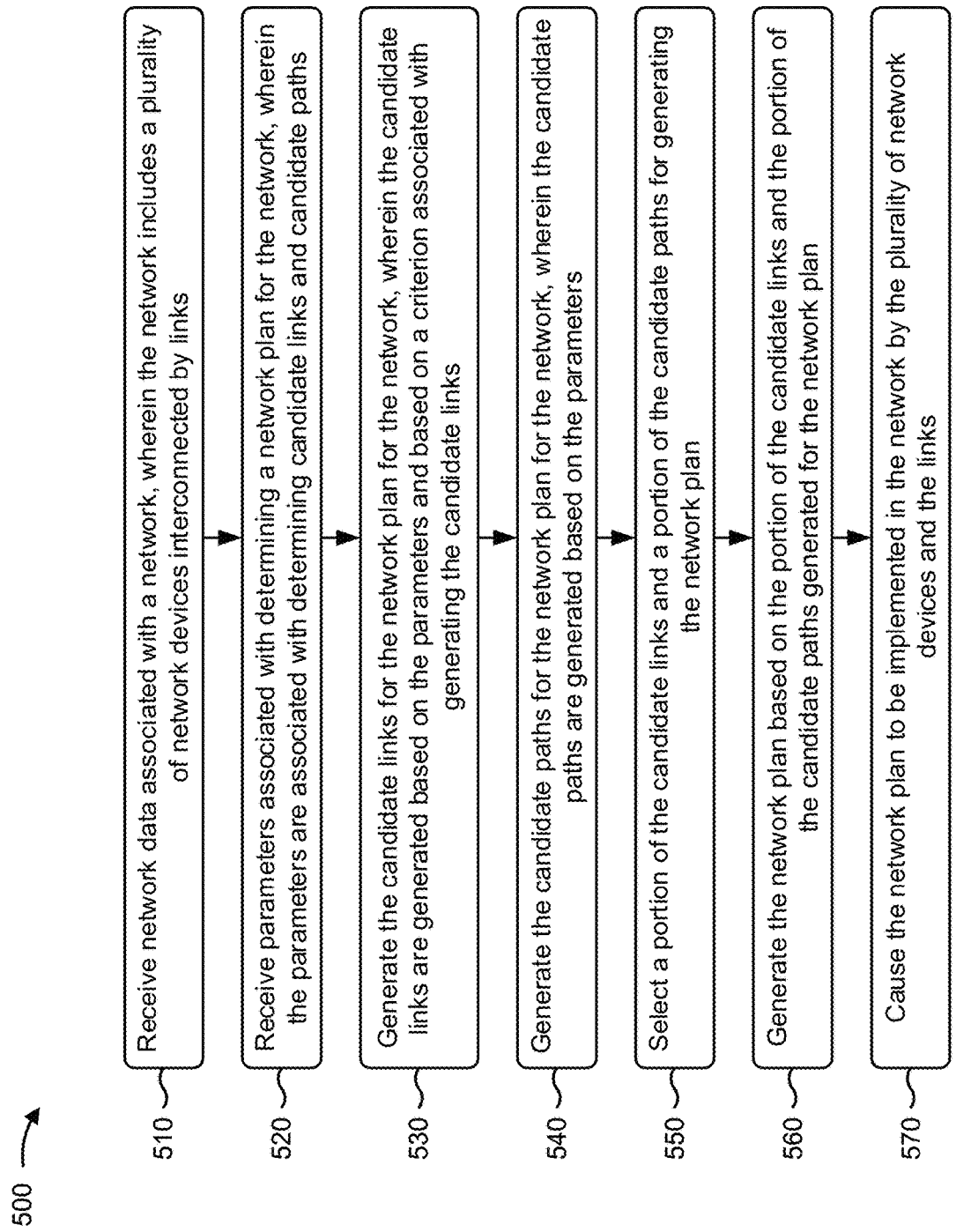

FIG. 5 is a flow chart of an example process 500 for generating candidate links and candidate paths before selecting links for an optimized optical network plan. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include receiving network data associated with a network, wherein the network includes a plurality of network devices interconnected by links (block 510). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links.

As further shown in FIG. 5, process 500 may include receiving parameters associated with determining a network plan for the network, wherein the parameters are associated with determining candidate links and candidate paths (block 520). For example, the controller platform (e.g., using computing resource 224, processor 320, communication interface 370, and/or the like) may receive parameters associated with determining a network plan for the network, as described above in connection with FIGS. 1A-3. In some aspects, the parameters may be associated with determining candidate links and candidate paths.

As further shown in FIG. 5, process 500 may include generating the candidate links for the network plan for the network, wherein the candidate links are generated based on the parameters and based on a criterion associated with generating the candidate links (block 530). For example, the controller platform (e.g., using computing resource 224, processor 320, memory 330, and/or the like) may generate the candidate links for the network plan for the network, as described above in connection with FIGS. 1A-3. In some aspects, the candidate links may be generated based on the parameters and based on a criterion associated with generating the candidate links.

As further shown in FIG. 5, process 500 may include generating the candidate paths for the network plan for the network, wherein the candidate paths are generated based on the parameters (block 540). For example, the controller platform (e.g., using computing resource 224, processor 320, storage component 340, and/or the like) may generate the candidate paths for the network plan for the network, as described above in connection with FIGS. 1A-3. In some aspects, the candidate paths may be generated based on the parameters.

As further shown in FIG. 5, process 500 may include selecting a portion of the candidate links and a portion of the candidate paths for generating the network plan (block 550). For example, the controller platform (e.g., using computing resource 224, processor 320, memory 330, and/or the like) may select a portion of the candidate links and a portion of the candidate paths for generating the network plan, as described above in connection with FIGS. 1A-3.

As further shown in FIG. 5, process 500 may include generating the network plan based on the portion of the candidate links and the portion of the candidate paths generated for the network plan (block 560). For example, the controller platform (e.g., using computing resource 224, processor 320, storage component 340, and/or the like) may generate the network plan based on the portion of the candidate links and the portion of the candidate paths generated for the network plan, as described above in connection with FIGS. 1A-3.

As further shown in FIG. 5, process 500 may include causing the network plan to be implemented in the network by the plurality of network devices and the links (block 570). For example, the controller platform (e.g., using computing resource 224, processor 320, memory 330, storage component 340, communication interface 370, and/or the like) may cause the network plan to be implemented in the network by the plurality of network devices and the links, as described above in connection with FIGS. 1A-3.

Process 500 may include additional implementations, such as any single implementation or any combination of implementations described below and/or in connection with one or more other processes described elsewhere herein.

In some implementations, the criterion may indicate that generating the candidate links is based at least in part on every pair of the plurality of network devices in the network. In some implementations, the criterion may indicate that the plurality of network devices are to be classified as an edge network device or a core network device when generating the candidate links, that generating the candidate links is based at least in part on edge-to-core links and core-to-core links in a same site of the network, that generating the candidate links is based at least in part on links between cores in different sites of the network, on a shortest path, and/or the like. In some implementations, the criterion may indicate that the plurality of network devices are to be classified as an edge network device or a core network device when generating the candidate links, that generating the candidate links is based at least in part on edge-to-core links and core-to-core links in a same site of the network, that generating the candidate links is based at least in part on disjoint paths between sites of the network, the candidate links are to connect core network devices with the disjoint paths, and/or the like.

In some implementations, the controller platform may receive additional network data from the network based on causing the network plan to be implemented in the network by the plurality of network devices, may modify the network plan based on the additional network data to generate a modified network plan, and may cause the modified network plan to be implemented in the network by the plurality of network devices.

In some implementations, the controller platform may provide, to a client device, information identifying the network plan, may receive, from the client device, a response indicating that the network plan is to be implemented, and may cause the network plan to be implemented in the network based on the response. In some implementations, the network may include an Internet Protocol (IP)-based optical network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
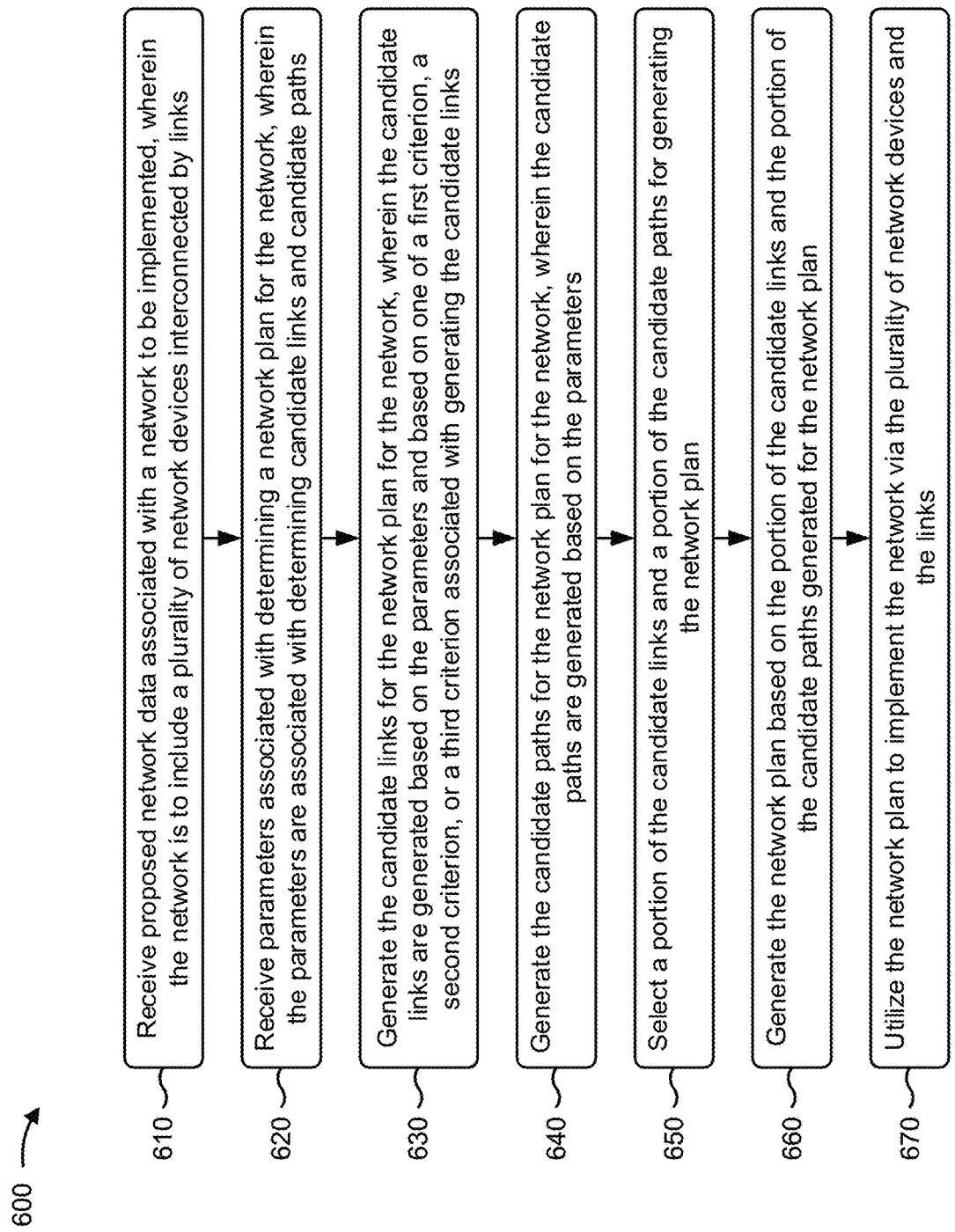

FIG. 6 is a flow chart of an example process 600 for generating candidate links and candidate paths before selecting links for an optimized optical network plan. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include receiving proposed network data associated with a network to be implemented, wherein the network is to include a plurality of network devices interconnected by links (block 610). For example, the controller platform (e.g., using computing resource 224, processor 320, communication interface 370, and/or the like) may receive proposed network data associated with a network to be implemented, as described above in connection with FIGS. 1A-3. In some aspects, the network may include a plurality of network devices interconnected by links.

As further shown in FIG. 6, process 600 may include receiving parameters associated with determining a network plan for the network, wherein the parameters are associated with determining candidate links and candidate paths (block 620). For example, the controller platform (e.g., using computing resource 224, processor 320, communication interface 370, and/or the like) may receive parameters associated with determining a network plan for the network, as described above in connection with FIGS. 1A-3. In some aspects, the parameters may be associated with determining candidate links and candidate paths.

As further shown in FIG. 6, process 600 may include generating the candidate links for the network plan for the network, wherein the candidate links are generated based on the parameters and based on one of a first criterion, a second criterion, or a third criterion associated with generating the candidate links (block 630). For example, the controller platform (e.g., using computing resource 224, processor 320, memory 330, and/or the like) may generate the candidate links for the network plan for the network, as described above in connection with FIGS. 1A-3. In some aspects, the candidate links may be generated based on the parameters and based on one of a first criterion, a second criterion, or a third criterion associated with generating the candidate links.

As further shown in FIG. 6, process 600 may include generating the candidate paths for the network plan for the network, wherein the candidate paths are generated based on the parameters (block 640). For example, the controller platform (e.g., using computing resource 224, processor 320, storage component 340, and/or the like) may generate the candidate paths for the network plan for the network, as described above in connection with FIGS. 1A-3. In some aspects, the candidate paths may be generated based on the parameters.

As further shown in FIG. 6, process 600 may include selecting a portion of the candidate links and a portion of the candidate paths for generating the network plan (block 650). For example, the controller platform (e.g., using computing resource 224, processor 320, memory 330, and/or the like) may select a portion of the candidate links and a portion of the candidate paths for generating the network plan, as described above in connection with FIGS. 1A-3.

As further shown in FIG. 6, process 600 may include generating the network plan based on the portion of the candidate links and the portion of the candidate paths generated for the network plan (block 660). For example, the controller platform (e.g., using computing resource 224, processor 320, storage component 340, and/or the like) may generate the network plan based on the portion of the candidate links and the portion of the candidate paths generated for the network plan, as described above in connection with FIGS. 1A-3.

As further shown in FIG. 6, process 600 may include utilizing the network plan to implement the network via the plurality of network devices and the links (block 670). For example, the controller platform (e.g., using computing resource 224, processor 320, memory 330, storage component 340, communication interface 370, and/or the like) may utilize the network plan to implement the network via the plurality of network devices and the links, as described above in connection with FIGS. 1A-3.

Process 600 may include additional implementations, such as any single implementation or any combination of implementations described below and/or in connection with one or more other processes described elsewhere herein.

In some implementations, the controller platform may generate the candidate paths for the network plan prior to selecting the portion of the candidate links for generating the network plan. In some implementations, the parameters may include a parameter indicating that the candidate paths are to be generated prior to selecting the candidate links for the network plan, a parameter indicating a maximum node degree associated with the candidate links, a parameter indicating minimum possible paths per flow associated with the candidate links, a parameter indicating diverse possible paths associated with the candidate links, a parameter indicating a quantity of shortest paths per demand associated with the candidate paths, a parameter indicating that diversity is required for the candidate paths, a parameter indicating that multiple paths with similar length are permitted for the candidate paths, a parameter indicating that the candidate paths are to avoid edge network devices in transit, and/or the like.

In some implementations, the first criterion may indicate that generating the candidate links is based at least in part on every pair of the plurality of network devices in the network. In some implementations, the second criterion may indicate that the plurality of network devices are to be classified as an edge network device or a core network device when generating the candidate links, that generating the candidate links is based at least in part on edge-to-core links and core-to-core links in a same site of the network, that generating the candidate links is based at least in part on links between cores in different sites of the network, on a shortest path, and/or the like. In some implementations, the third criterion may indicate that the plurality of network devices are to be classified as an edge network device or a core network device when generating the candidate links, that generating the candidate links is based at least in part on edge-to-core links and core-to-core links in a same site of the network, that generating the candidate links is based at least in part on disjoint paths between sites of the network, that the candidate links are to connect core network devices with the disjoint paths, and/or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
receiving, by a device, network data associated with a network,
wherein the network includes a plurality of network devices interconnected by links;
receiving, parameters for determining a network plan for the network,
wherein the parameters are associated with traffic flow and traffic demand;
generating candidate paths for each potential network plan of a plurality of potential network plans for the network,
wherein the candidate paths are generated based on the parameters;
generating and only after generating the candidate paths, links for each of the candidate paths;
selecting a portion of the links and a portion of the candidate paths for generating each potential network plan of the plurality of potential network plans;
generating each potential network plan of the plurality of potential network plans based on the portion of the links and the portion of the candidate paths generated for each potential network plan,
wherein each potential network plan of the plurality of potential network plans includes information identifying a combination of the portion of the links and the portion of the candidate paths generated for the potential network plan;
identifying a potential network plan, of the plurality of potential network plans, that reduces resource usage associated with operating the network as compared to other potential network plans of the plurality of potential network plans; and causing the identified potential network plan to be implemented in the network by the plurality of network devices.

2. The method of claim 1, wherein the network data includes data identifying one or more of:

the links interconnecting the plurality of network devices,
wherein the links for each of the candidate paths are included in the links interconnecting the plurality of network devices, capacities of the plurality of network devices, capacities of the links interconnecting the plurality of network devices, paths through the network provided by the plurality of network devices,
wherein the candidate paths are based on the paths through the network, sources of the paths through the network, destinations of the paths through the network, or capacities of the paths through the network.

3. The method of claim 1, wherein the parameters include a parameter indicating that the candidate paths are to be generated prior to generating the links for each potential network plan.

4. The method of claim 1, wherein generating the links is based at least in part on every pair of the plurality of network devices in the network.

5. The method of claim 1, further comprising:

classifying the plurality of network devices as edge network devices or core network devices,
wherein a network device of the plurality of network devices is classified as an edge network device if the network device is associated with one or more traffic flow demands, and
wherein a network device of the plurality of network devices is classified as a core network device if the network device is associated with one or more connections to an optical layer of the network.

6. The method of claim 1, wherein:

generating the links is based at least in part on edge-to-core links and core-to-core links in a same site of the network, generating the links is based at least in part on disjoint paths between sites of the network, and the links are generated to connect core network devices with the disjoint paths.

7. The method of claim 1, wherein identifying the potential network plan, of the plurality of potential network plans, that reduces resource usage associated with operating the network comprises:

determining a cost associated with each of the plurality of potential network plans based on the network data;

determining a quantity of predicted traffic demand failures associated with each of the plurality of potential network plans based on the network data; and identifying the potential network plan that reduces resource usage associated with operating the network based on the plurality of costs and the quantities of predicted traffic demand failures associated with the plurality of potential network plans.

8. A device, comprising:

one or more memories; and one or more processors communicatively coupled to the one or more memories, to:

receive network data associated with a network,
wherein the network includes a plurality of network devices interconnected by links;

receive parameters associated with determining a network plan for the network,
wherein the parameters are associated with determining candidate links and candidate paths, and
wherein the parameters include a parameter indicating that candidate paths are to avoid edge network devices;

generate the candidate paths for the network plan for the network,
wherein the candidate paths are generated based on the parameters;

generate the candidate links for the network plan for the network,
wherein the candidate links are generated based on the candidate paths, the parameters, and a criterion associated with generating the candidate links, and
wherein the candidate links are generated based at least in part on links between cores in different sites of the network, on a shortest path of respective candidate paths;

select a portion of the candidate links and a portion of the candidate paths for generating the network plan;

generate the network plan based on the portion of the candidate links and the portion of the candidate paths generated for the network plan; and cause the network plan to be implemented in the network by the plurality of network devices and the links.

9. The device of claim 8, wherein the criterion indicates that generating the candidate links is to be based at least in part on every pair of the plurality of network devices in the network.

10. The device of claim 8, wherein the criterion indicates that:

the plurality of network devices are to be classified as an edge network device or a core network device when the candidate links are generated, and generating the candidate links is to be based at least in part on edge-to-core links and core-to-core links in a same site of the network.

11. The device of claim 8, wherein the criterion indicates that:

the plurality of network devices are to be classified as an edge network device or a core network device when the candidate links are generated, generating the candidate links is to be based at least in part on edge-to-core links and core-to-core links in a same site of the network, generating the candidate links is to be based at least in part on disjoint paths between sites of the network, and the candidate links are to connect core network devices with the disjoint paths.

12. The device of claim 8, wherein the one or more processors are further to:

receive additional network data from the network based on causing the network plan to be implemented in the network by the plurality of network devices;

modify the network plan based on the additional network data to generate a modified network plan; and cause the modified network plan to be implemented in the network by the plurality of network devices.

13. The device of claim 8, wherein the one or more processors are further to:

provide, to a client device, information identifying the network plan; and receive, from the client device, a response indicating that the network plan is to be implemented, wherein the one or more processors, when causing the network plan to be implemented in the network, are to:

cause the network plan to be implemented in the network based on the response.

14. The device of claim 8, wherein the network includes an Internet Protocol (IP)-based optical network.

15. A non-transitory computer-readable medium storing instructions, the instructions comprising:

one or more instructions that, when executed by one or more processors, cause the one or more processors to:

receive network data associated with a network, wherein the network includes a plurality of network devices interconnected by links;

receive parameters associated with determining a network plan for the network, wherein the parameters are associated with determining candidate links and candidate paths, and wherein the parameters include a parameter indicating that candidate paths are to avoid edge network devices;

generate the candidate paths for the network plan for the network, wherein the candidate paths are generated based on the parameters;

generate the candidate links for the network plan for the network, wherein the candidate links are generated based on the candidate paths, the parameters, and a criterion associated with generating the candidate links; and wherein the candidate links are generated based at least in part on links between cores in different sites of the network, on a shortest path of respective candidate paths;

select a portion of the candidate links and a portion of the candidate paths for generating the network plan;

generate the network plan based on the portion of the candidate links and the portion of the candidate paths generated for the network plan; and utilize the network plan to implement the network via the plurality of network devices and the links, wherein the network is implemented at least in part by providing instructions to one or more of the plurality of network devices.

16. The non-transitory computer-readable medium of claim 15, wherein the criterion indicates that generating the candidate links is to be based at least in part on:

links between edge nodes and core nodes located at a same site, links between core nodes located at a same site, or links between core nodes located at different sites on a shortest optical path.

17. The non-transitory computer-readable medium of claim 15, wherein the parameters include a parameter indicating minimum possible paths per flow associated with the candidate links.

18. The non-transitory computer-readable medium of claim 15, wherein the instructions to the one or more of the plurality of network devices instruct the one or more of the plurality of network devices to reserve bandwidth for a traffic demand.

19. The non-transitory computer-readable medium of claim 15, wherein the criterion indicates that:

the plurality of network devices are to be classified as an edge network device or a core network device when the candidate links are generated, generating the candidate links is to be based at least in part on edge-to-core links and core-to-core links in a same site of the network, and generating the candidate links is to be based at least in part on links between cores in different sites of the network, on a shortest path.

20. The non-transitory computer-readable medium of claim 15, wherein the criterion indicates that:

the plurality of network devices are to be classified as an edge network device or a core network device when the candidate links are generated, generating the candidate links is to be based at least in part on edge-to-core links and core-to-core links in a same site of the network, generating the candidate links is to be based at least in part on disjoint paths between sites of the network, and the candidate links are to connect core network devices with the disjoint paths.

* * * * *